US012092921B1

(12) United States Patent
Wu et al.

(10) Patent No.: US 12,092,921 B1
(45) Date of Patent: Sep. 17, 2024

(54) BACKLIGHT MODULE AND DISPLAY DEVICE

(71) Applicant: HKC CORPORATION LIMITED, Shenzhen (CN)

(72) Inventors: Biao Wu, Shenzhen (CN); Haijiang Yuan, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/458,572

(22) Filed: Aug. 30, 2023

(30) Foreign Application Priority Data

Mar. 2, 2023 (CN) .......................... 202310191219.3

(51) Int. Cl.
G02F 1/13357 (2006.01)
G02F 1/1333 (2006.01)

(52) U.S. Cl.
CPC ...... *G02F 1/1336* (2013.01); *G02F 1/133308* (2013.01); *G02F 1/133385* (2013.01)

(58) Field of Classification Search
CPC .................. G02B 6/0051; G02B 7/006; G02B 2027/0169; G02F 1/133608; G02F 1/133385; G02F 1/133308; G02F 1/13357; G02F 1/1333
See application file for complete search history.

(56) References Cited

U.S. PATENT DOCUMENTS 4,372,071 A * 2/1983 Vicino ............... G09F 15/0025
40/624
2016/0349566 A1* 12/2016 Na .................... G02F 1/133608

FOREIGN PATENT DOCUMENTS

| CN | 202165953 U | 3/2012 |
| CN | 202563215 U | 11/2012 |
| CN | 113805296 A | 12/2021 |
| TW | 200837446 A | 9/2008 |
| TW | M341854 U | 10/2008 |

* cited by examiner

*Primary Examiner* — William J Carter
(74) *Attorney, Agent, or Firm* — Maier & Maier, PLLC

(57) ABSTRACT

A backlight module and a display device, including a diffuser plate and a back plate. The back plate includes a bottom plate and a side wall surrounding the bottom plate, the diffuser plate is connected with the side wall; a plurality of light-emitting bodies are provided on an inner wall of the back plate, the diffuser plate is positioned at an out-light side of the light-emitting bodies, an air source assembly and a plurality of nozzles are provided on an outer wall of the bottom plate; the air source assembly is in communication with each nozzle for conveying compressed air to each nozzle, air jet holes are cut on the bottom plate at positions corresponding to each air jet port of the nozzles, and the nozzles are used for spraying the compressed air through the air jet holes to form air supporting columns to support the diffuser plate.

16 Claims, 5 Drawing Sheets

BACKLIGHT MODULE AND DISPLAY DEVICE

CROSS-REFERENCE TO RELATED APPLICATIONS

This disclosure claims the benefit of Chinese Patent Application No. 202310191219.3, entitled BACKLIGHT MODULE AND DISPLAY DEVICE, which was filed with China National Intellectual Property Administration on Mar. 2, 2023, and the entire contents of which are incorporated herein by reference.

TECHNICAL FIELD

This disclosure relates to the field of display technology, in particular to a backlight module and a display device.

BACKGROUND

A liquid crystal display module is composed of a liquid crystal display panel and a backlight module. Being a passive luminescent element, a liquid crystal display panel should be provided with a backlight module to provide evenly distributed light sources with sufficient brightness, so that the liquid crystal display panel may display images normally. Therefore, the lighting effect of the backlight module will directly affect the display effect of the liquid crystal display panel.

A backlight module mainly includes a diffuser plate and a back plate configured with a number of light-emitting bodies. There is a cavity between the diffuser plate and the back plate, such that the light-emitting bodies may evenly project light to the diffuser plate, to form a uniform area light source for the liquid crystal display panel after the light is diffused through the diffuser plate. it becomes a uniform surface light source to provide the liquid crystal display panel. In this case, the size of the diffuser plate should be increased with the size of the display device, and currently supporting columns are generally provided at the back plate to support the diffuser plate to prevent it from collapsing, bending or other deformation.

However, the light emitted by the light-emitting bodies around the supporting columns will be blocked by the supporting columns and dark shadows will form on the diffuser plate, which will reduce the display effect of the display panel.

SUMMARY

In view of the above, this disclosure provides a backlight module and a display device, for providing flexible supports for a diffuser plate, and the display effect is improved.

To realize the above purposes, a first aspect of the embodiments of this disclosure provides a backlight module including a diffuser plate and a back plate disposed opposite to each other;
the back plate includes a bottom plate and a side wall surrounding the bottom plate, and the diffuser plate is connected with the side wall of the back plate;
a plurality of light-emitting bodies are provided at intervals on an inner wall of the back plate, the diffuser plate is positioned at an out-light side of the plurality of light-emitting bodies, and an air source assembly and a plurality of nozzles, which nozzles are arranged at intervals, are provided on an outer wall of the bottom plate; and
the air source assembly is in communication with each of the nozzles for conveying compressed air to each of the nozzle, air jet holes are cut on the bottom plate at positions corresponding to each air jet port of the nozzles, and the nozzles are used for spraying the compressed air through the air jet holes to form air supporting columns to support the diffuser plate.

In one possible implementation in the first aspect, the air source assembly includes:
a compressor and an air source treatment device;
the compressor is fixed to the outer wall of the bottom plate through a compressor fastener, and the compressor is used for generating the compressed air; and
an air inlet of the air source treatment device is in communication with an air outlet of the compressor, an air outlet of the air source treatment device is in communication with each air inlet of the nozzles, and the air source treatment device is used for adjusting the amount of the compressed air and/or filtering the compressed air.

In one possible implementation in the first aspect, the air source assembly further includes a solenoid valve, through which the air outlet of the air source treatment device is in communication with each of the nozzles.

In one possible implementation in the first aspect, the air outlets of the air source treatment device correspond to the nozzles one to one, the air outlets of the air source treatment device correspond to the solenoid valves one to one, and each of the air outlets of the air source treatment device is in communication with a corresponding nozzle through a corresponding solenoid valve.

In one possible implementation in the first aspect, the air source assembly further includes a muffler, which is connected to the compressor and/or to the air source treatment device.

In one possible implementation in the first aspect, the nozzles include a plurality of air jet ports, whose cross-sectional area gradually increases near the inner wall of the back plate in a direction from the inner wall to an outer wall of the back plate.

In one possible implementation in the first aspect, a heat dissipation hole is cut on the side wall of the back plate, and a filter screen is covered on the heat dissipation hole.

In one possible implementation in the first aspect, a reflective sheet is covered on the inner wall of the back plate, first through holes are cut on the reflective sheet at positions corresponding to each air jet ports of the nozzles, second through holes are cut on the reflective sheet at positions corresponding to each heat dissipation hole, and both the first through holes and the second through holes are covered with a reflective air-permeable sheet.

In one possible implementation in the first aspect, the backlight module further includes a back housing, which is provided on an outer wall of the back plate, the air source assembly and each of the nozzles are positioned in a cavity surrounded and formed by the back housing and the back plate, a vent hole is cut on the back housing and a filter screen is covered on the vent hole.

A second aspect of the embodiments of this disclosure provides a display device including a display panel and the backlight module described in the above first aspect, in which the display panel is arranged at an out-light side of the backlight module.

In the backlight module and the display device provided in the embodiments of this disclosure, an air source assembly and a plurality of nozzles, which nozzles are arranged at intervals, are provided on the outer wall of the bottom plate of the back plate. The air source assembly is in communication with each nozzle and may convey compressed air to each nozzle. Air jet holes are provided on the bottom plate at the positions corresponding to each air jet port of the nozzles, so that the compressed air may be sprayed through the nozzles to form air supporting columns after passing through the air jet holes, which may provide flexible support for the diffuser plate. Therefore, there is no need to install supporting columns on the back plate, and the problem that supporting columns block light and form dark shadows may be solved, and the display effect may be effectively improved.

DETAILED DESCRIPTION OF THE EMBODIMENTS

In existing technology, a backlight module usually includes a diffuser plate. In addition to the diffuser plate, the backlight module also includes multiple optical film sheets on the diffuser plate. The weight of these optical film sheets and the diffuser plate will cause the center of the diffuser plate to sag slightly, which becomes more obvious as the size of the display device increases.

However, in addition to the weight of the optical film sheets and the diffuser plate causing the deformation, a relatively high temperature of the backlight module may also intensify the deformation of the diffuser plate.

To solve the above problems, the embodiments of this disclosure provide a backlight module and a display device. This disclosure is described below with a combination of accompanying drawings and embodiments.

The terms used in the embodiments of this disclosure are intended only to explain specific embodiments of this disclosure and are not intended to limit this disclosure. The following specific embodiments may be combined with each other, and same or similar concepts or processes may not be repeated in some embodiments.

The technical solution provided in the embodiments of this disclosure is applicable to a direct-down backlight module or applicable to a side-in backlight module. In FIGS. 1 to 5 provided in the embodiments of this disclosure, a direct-down backlight module is taken as an example to illustrate.

Figure 1:
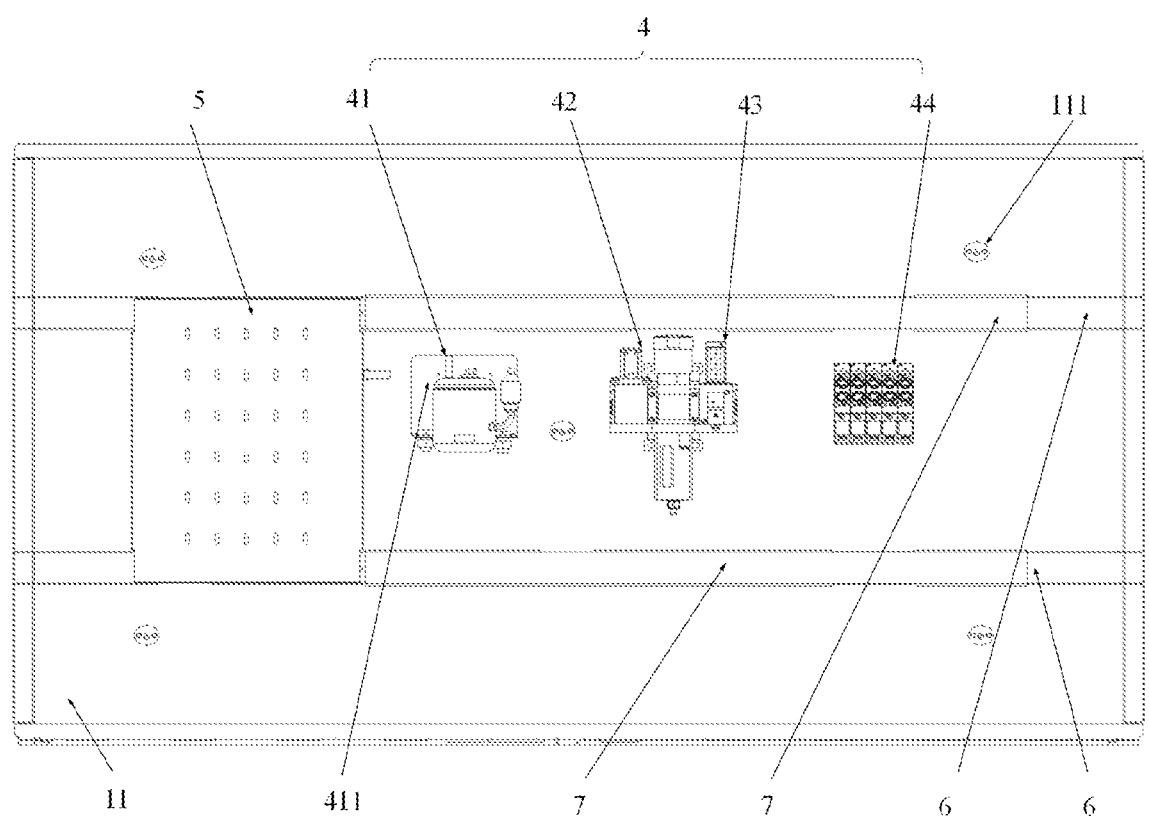
FIG. 1 is a schematic structural diagram of a backlight module provided in some embodiments of this disclosure.
Figure 5:
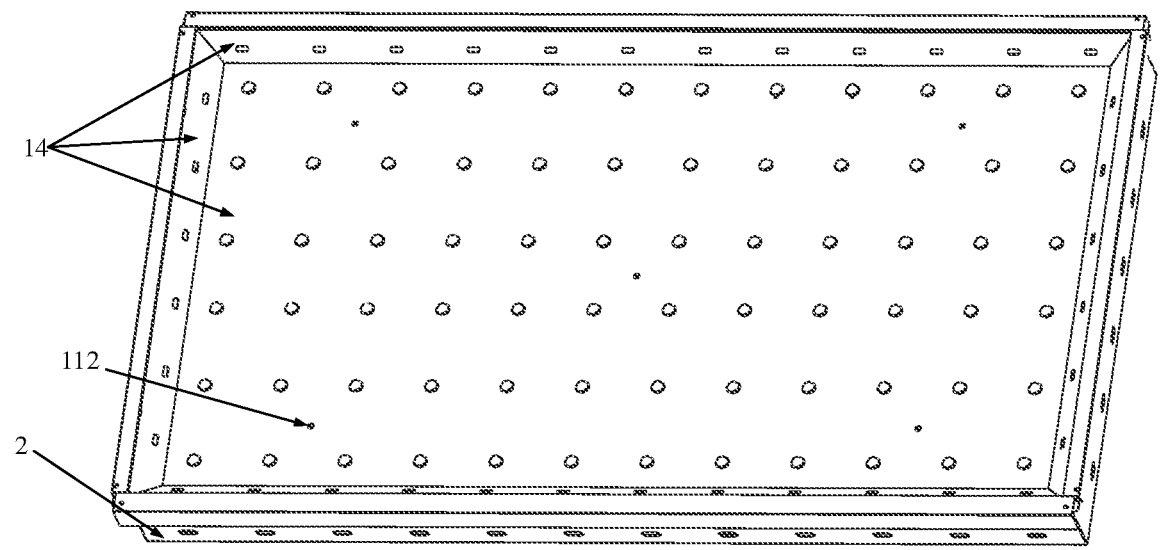
FIG. 5 is an axonometric view of a back plate provided in some embodiments of this disclosure.

Please refer to FIG. 1 and FIG. 5 together. The backlight module may include a diffuser plate 3 and a back plate 1, which are disposed opposite to each other. The back plate 1 may include a bottom plate 11 and a side wall 12 surrounding the bottom plate 11, and the diffuser plate 3 is connected with the side wall 12 of the back plate 1. A plurality of light-emitting bodies 13 are provided at intervals on an inner wall of the back plate 1. The diffuser plate 3 is located at an out-light side of the plurality of light-emitting bodies 13. An air source assembly 4 and a plurality of nozzles 111, which nozzles are arranged at intervals, are provided on an outer wall of the bottom plate 11. The air source assembly 4 is in communication with each nozzle 111 for conveying compressed air to each nozzle 111. Air jet holes 112 are cut on the bottom plate 11 at the positions corresponding to each air jet port 1115 of the nozzles 111. In this case, the nozzles 111 are each used to spray the compressed air through the air jet hole 112 to form an air supporting column, so as to provide support for the diffuser plate 3.

Specifically, the diffuser plate 3 is located at the out-light side of the plurality of light-emitting bodies 13, such that the light produced by the light-emitting bodies 13 may be spread to the display panel more evenly to provide backlight for the display panel.

The air source assembly 4 and the plurality of nozzles 111, which nozzles are arranged at intervals, are provided ed on the outer wall of the bottom plate 11 of the back plate 1. The air source assembly 4 is in communication with each nozzle 111 and may convey the compressed air to each nozzle 111. The air jet holes 112 are provided on the bottom plate 11 at the positions corresponding to each air jet port 1115 of the nozzles 111, such that the compressed air sprayed by the nozzles 111 may form air supporting columns after passing through the air jet holes 112, which provides flexible support for the diffuser plate 3. Therefore, there is no need to install supporting columns on the back plate 1, and the problem that supporting columns block light and form dark shadows may be avoided, and the display effect may be effectively improved. Besides, in case where a large amount of compressed air is sprayed to the cavity formed by the bottom plate 11 and the side wall 12 around the bottom plate 11, the large amount of compressed air will expand at atmospheric pressure, generating an outward pressure, which further supports the diffuser plate 3. This ensures the diffuser plate 3 to be supported evenly, so that the diffuser plate 3 is generally even.

The diffuser plate 3 may be connected with an end face or a side face of the side wall 12 of the back plate 1, the side wall 12 around the bottom plate 11 may also be provided with an outward extending fixed plate, and the diffuser plate 3 may be connected with the side wall 12 of the back plate 1 through the fixed plate.

Figure 2:
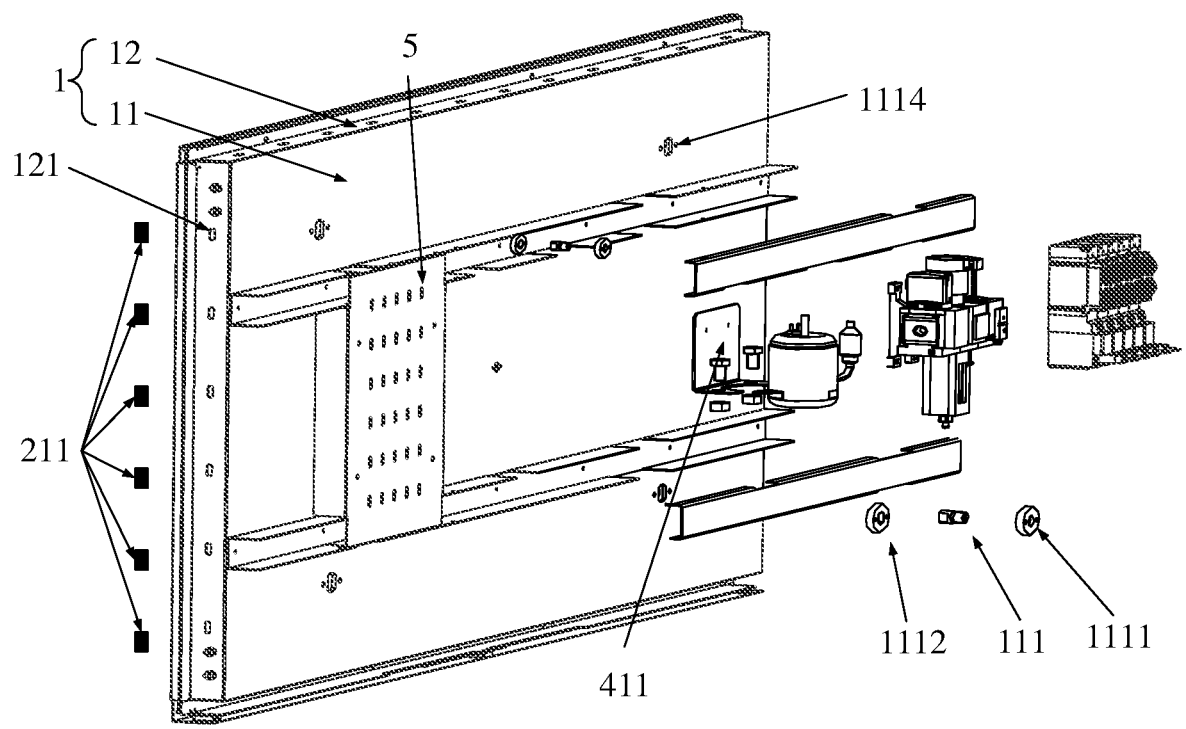
FIG. 2 is an exploded view of a back plate provided in some embodiments of this disclosure.

Referring to FIG. 2, in some embodiments of this disclosure, the bottom end of the side wall 12 around the bottom plate 11 may be flush with the bottom plate 11.

Figure 4:
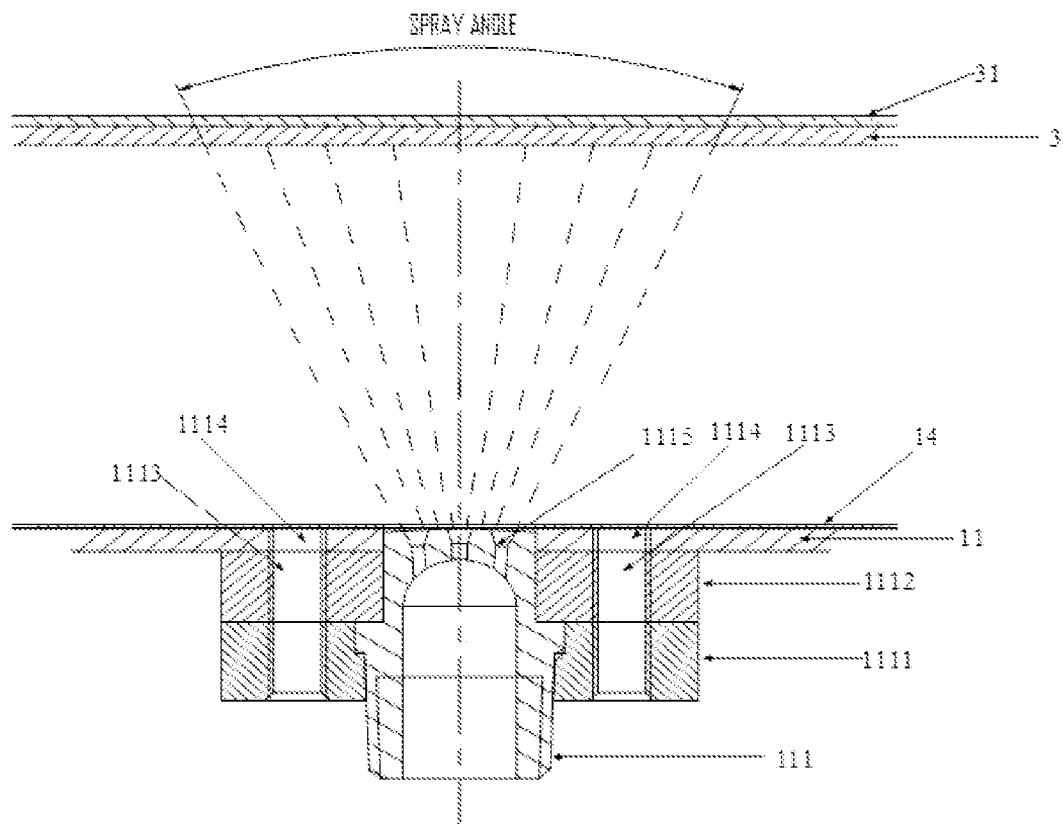
FIG. 4 is a cross-sectional diagram of a backlight module provided in some embodiments of this disclosure.

Referring to FIG. 4, in some embodiments of this disclosure, an optical film sheet 31 may be provided at the out-light side of the diffuser plate 3 to homogenize the light emitted from the diffuser plate 3.

In this case, the optical film sheet 31 may include an integrated optical film and a diffusion film sheet. The diffusion film sheet may include at least one of a diffusion film, a prism film, and a brightness enhancement film, and the type and number of the diffusion film sheet may be adjusted according to the actual needs.

In some embodiments of this disclosure, the material and thickness of bottom plate 11 may be a cold rolled sheet of iron of 0.8-1.0 mm, such that the bottom plate 11 may have reduced weight while having a certain supporting strength.

Figure 3:
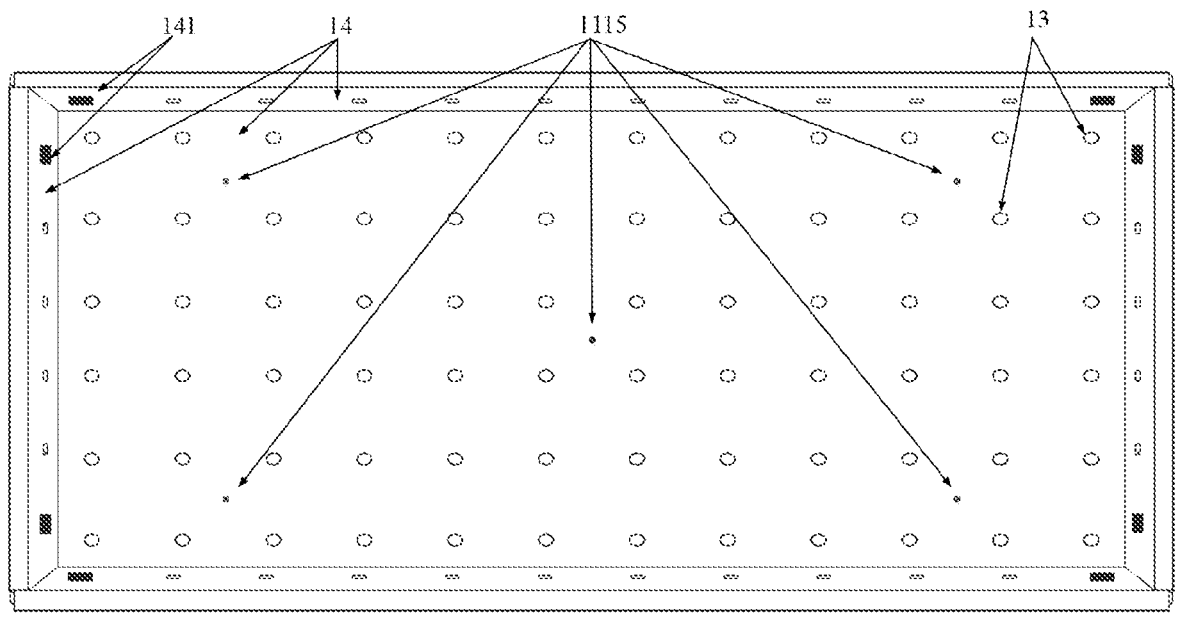
FIG. 3 is a front view of a back plate provided in some embodiments of this disclosure.

As shown in FIG. 3, the light-emitting bodies 13 may be specifically arranged on the bottom plate 11 in an array to form a more uniform light.

The air source assembly 4 and the nozzle 111 may be connected through air ducts. The air source assembly 4 may compress atmospheric air to produce compressed air, and then the compressed air may be conveyed to each nozzle 111 through the air ducts.

As shown in FIG. 1 and FIG. 2, the air source assembly 4 may include a compressor 41. The compressor 41 is an air pressure generator that may convert mechanical energy into air pressure energy, which may extract atmospheric air through an air inlet and then compress it. The compressor 41 may be fixed to the outer wall of the bottom plate 11 by means of a compressor fastener 411.

After being generated by the compressor 41, the compressed air may carry pollutants, for example, solid particles such as dust and scale, and vaporized materials such as compressor lubricant and condensate water. Considering this, in some embodiments of this disclosure, the air source assembly 4 may further include an air source treatment device 42. The compressed air generated by the compressor 41 may be filtered through the air source treatment device 42, so that the pollutants carried by the compressed air may be effectively reduced when the nozzles 111 spray the compressed air to the cavity formed by the bottom plate 11 and the side wall 12 surrounding the bottom plate 11, so as to improve the cleanliness in the backlight module, and further prolong the service life of the backlight module.

In this case, the air inlet of the air source treatment device 42 is in communication with the air outlet of the compressor 41, and the air outlet of air source treatment device 42 is in communication with each air inlet of the nozzles 111. The air source treatment device 42 may be fixed on the outer wall of the bottom plate 11 through fasteners such as screws.

Specifically, the compressed air generated by the compressor 41 is conveyed into the air source treatment device 42 through the air outlet of the compressor 41. The air source treatment device 42 may include an air filter, an oil-water separator and a dryer, etc. In some embodiments, the air source treatment device 42 may further include a pressure controller through which the pressure of the compressed air may be adjusted.

In some embodiments, an air filter may also be provided at the air inlet of the compressor 41 for an initial filtration of the pollutants in the air extracted by the compressor 41, thereby reducing the amount of the pollutants entering the compressor 41.

Further, referring to FIG. 1 and FIG. 2, as a possible implementation of the embodiments of this disclosure, the air source assembly 4 may further include solenoid valves 44. The air outlet of the air source treatment device 42 may be in communication with each nozzle 111 through the solenoid valves 44, so as to facilitate the control of the air jet of each nozzle 111 through the solenoid valves 44.

In some embodiments of this disclosure, the air source treatment device 42 may be in communication with each nozzle 111 through one air outlet and the solenoid valves 44 to jointly control the air jet of each nozzle 111.

In some other embodiments of this disclosure, optionally, the air outlets of the air source treatment device 42 each correspond to a nozzle 111, the air outlets of the air source treatment device 42 each correspond a solenoid valve 44, and the air outlets of the air source treatment device 42 are each in communication with a corresponding nozzle 111 through a corresponding solenoid valve 44. In this way, the air jet of each nozzle 111 may be controlled separately.

As an example, the compressed air, after being filtered by the air source treatment device 42, is conveyed to the solenoid valves 44 through the air ducts, and whether the compressed air may be conveyed to the nozzles 111 is determined according to the operating state of the solenoid valves 44. In this case, a solenoid valve 44 may be fixed by a solenoid valve fastener, for example, the solenoid valve 44 may be fixed by screws.

As shown in FIG. 1 and FIG. 3, in an exemplary case where the solenoid valves 44 are each a two-position five-way solenoid valve, each two-position five-way solenoid valve controls the on and off of the compressed air of a corresponding nozzle 111. For example, when the two-position five-way solenoid valve is in an open state, the compressed air conveyed by the air source treatment device 42 may reach the nozzle 111 in FIG. 1 via the air duct after passing through the two-position five-way solenoid valve, and be sprayed into the cavity formed by the bottom plate 11 and the side wall 12 surrounding the bottom plate 11 through the nozzle 111 to provide flexible support for the diffuser plate 3. When the solenoid valve 44 is in an closed state, the compressed air output by the air source treatment device 42 may be interrupted by the solenoid valve 44, so that the nozzle 111 stops spraying the compressed air.

In one possible implementation, a solenoid valve 44 may further include a regulating valve to realize controlling the flow rate of the compressed air passing through the solenoid valve 44. In this embodiment, flow rate refers to the volume of the compressed air passing through a section of the air duct per unit time.

It is understood that, in practice, solenoid valves 44 may also be replaced by electric valves. The switch of each solenoid valve 44 may be controlled by a user, or be intelligently controlled by an air source control device of the backlight module.

Further, referring to FIG. 1, the air source assembly 4 may further include a muffler 43, which is connected to the compressor 41 and/or to the air source treatment device 42.

As an example, user experience of the display device may be affected by the noise generated by the backlight module, especially when the display device is displaying pictures. Therefore, in order to reduce the noise generated by the air source assembly 4, the muffler 43 may be arranged to realize noise reduction. For example, the noise of the compressor 41 is caused by the air when being compressed and compressing in the operating process, and it is possible to connect the muffler 43 to the air outlet of the compressor 41 to reduce the noise in case where the noise generated by the compressor 41 affects the user experience. For example, in case where the noise generated by the air source treatment device 42 affects the user experience, it is possible to connect the muffler 43 to the air outlet of the air source treatment device 42, so as to reduce the noise of the air source treatment device 42. For example, in case where the compressor 41 and the air source treatment device 42 both generate large noise, it is possible to connect the muffler 43 to both the compressor 41 and the air source treatment device 42 to reduce the noise.

It is understood that in actual operation, in order to improve user experience and simplify the structure of the air source assembly, it is also possible to choose a compressor 41 and/or an air source treatment device 42 with its own muffler function.

In this embodiment, the nozzle 111 may include a larger air jet port 1115. In some embodiments of this disclosure, the nozzle 111 may also include a plurality of smaller air jet ports 1115, so as to increase the pressure of the air output from the nozzle 111. Besides, it is also possible to expand the contact area between the air supporting column and the diffuser plate 3 by adjusting the spray angle of the air jet port 1115, so as to better support the diffuser plate 3.

The inner wall of the air jet port 1115 of the nozzle 111 may be cylindrical. In some embodiments of this disclosure, alternatively, the cross-sectional area of the air jet port 1115 gradually increases near the inner wall of the back plate 1 from inside to outside, to increase the contact area between the air supporting column and the diffuser plate 3, thus better supporting the diffuser plate 3.

The number and position of the nozzles 111 may be determined according to the area and weight of the diffuser plate 3 and the actual adjustment situation. For example, different nozzles 111 may spray compressed air of different angles, and the resulted air supporting columns will be different. In practice, it is possible to calculate the contact area between the air supporting columns and the diffuser plate 3 according to the actual use area by combining the compressed air spray angles of the nozzles 111, so as to obtain the number of nozzles 111 which need to be installed on the diffuser plate 3. The air jet holes 112 are directly facing the air jet ports 1115 of the nozzles 111, and the number of the air jet holes 112 is the same as that of the nozzles 111. FIG. 2 and FIG. 3 illustrate an example in which the number is 5.

In some embodiments, the pressure of air sprayed by the nozzles 111 may be raised to meet the pressure requirements of air injection by controlling the pressure of the generated compressed air. In some other embodiments, the pressure of air sprayed by the nozzles 111 may also be adjusted by adjusting the air spray angles of the nozzles 111.

As shown in FIG. 4, the nozzles 111 may be fixed to the outer wall of the bottom plate 11 by the nozzle fasteners, such that the movement of the nozzles 111 in a circumferential direction and in a horizontal and/or vertical direction may be restricted. The fixing manners may include but not be limited to riveting connection, screw connection, etc. It is understood that the nozzles 111 may be detachable to facilitate later maintenance and replacement of the nozzles 111.

Figure 6:
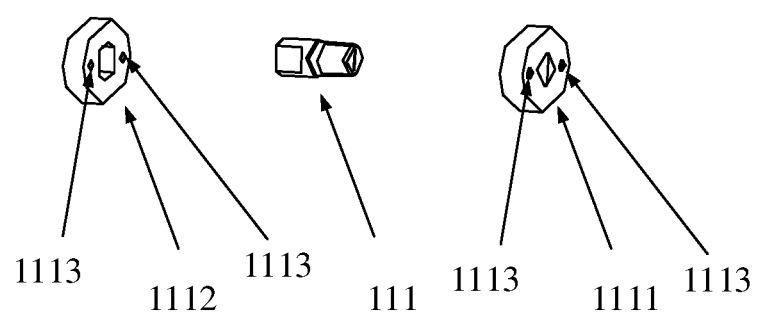
FIG. 6 is an oblique view of a nozzle fastener provided in some embodiments of this disclosure.

In some embodiments, in order to fix the nozzle 111 to the outer wall of the bottom plate 11, it is possible to select multiple nozzle fasteners to use in combination to achieve the function of fixing the nozzle 111. In some other embodiments, it is also possible to select only one type of nozzle fastener to fix the nozzle 111. As an example, referring to FIGS. 4 and 6, a first nozzle fastener 1111 and a second nozzle fastener 1112 are used in combination to fix the nozzle 111 to the outer wall of the bottom plate 11. Specifically, as shown in FIG. 6, a side wall (hereinafter referred to as a first side wall) of the nozzle 111 away from one end of the bottom plate 11 may extend outward to form a boss. That is, the maximum outer diameter of the first side wall of the nozzle 111 is greater than the maximum outer diameter of a side wall (hereinafter referred to as a second side wall) of nozzle 111 near one end of the bottom plate 11. In addition, part of the first side wall of the nozzle 111 away from one end of the bottom plate 11 may shrink inward to form a step. The first nozzle fastener 1111 is arranged around the first side wall of the nozzle 111, has an inner wall matched with the first side wall of the nozzle 111. The second nozzle fastener 1112 is arranged around the second side wall of the nozzle 111, and has an inner wall matched with the second side wall of the nozzle 111.

As shown in FIG. 4, the inner walls of the first nozzle fastener 1111 and of the second nozzle fastener 1112 may restrict a movement of the nozzle 111 in the horizontal direction. The boss structure may restrict an upward movement of the nozzle 111 (that is, in a direction towards the bottom plate 11). The step structure may restrict a downward movement of the nozzle 111 (i.e., in a direction away from the bottom plate 11). At the same time, part of the first side wall of the nozzle 111 shrinks inward to form a step, which may also restrict a movement of the nozzle 111 in the circumferential direction.

Multiple (as an example, FIG. 6 illustrates two) first fastening holes 1113 may be provided on the first nozzle fastener 1111 and on the second nozzle fastener 1112, and second fastening holes 1114 may be cut on the bottom plate 11 at the positions corresponding to the first fastening holes 1113. When fixing the nozzle 111, a screw may pass through the first fastening hole 1113 and the second fastening hole 1114, to fix the first nozzle fastener 1111, the second nozzle fastener 1112 and the nozzle 111 on the outer wall of the bottom plate 11.

It is understood that in some other embodiments, a nozzle 111 with a clamp may also be selected to be fixed to the outer wall of the bottom plate 11 by means of its own elastic clamp.

When the solenoid valve 44 is in the open state, the compressed air output by the air source treatment device 42 is conveyed to the nozzle 111 through the air duct. The air jet port 1115 is arranged to the nozzle 111 in a direction closing to the inner wall of the back plate 1. Through the air jet port 1115 of the nozzle 111, the compressed air is sprayed into the cavity formed by the bottom plate 11 and the side wall 12 surrounding the bottom plate 11. Referring to FIG. 4, taking three air jet ports 1115 as an example, the cross-sectional area of each air jet port 1115 gradually increases near the inner wall of back plate 1 from inside to outside. Due to the high pressure of the compressed air, the compressed air may have most of its pressure energy at the nozzle 111 converted into kinetic energy and be sprayed at the air jet ports 1115 at a high speed, such that the sprayed air has the shape of diverging cone, to provide an increased area for flexibly supporting the diffuser plate 3.

It should be noted that it is possible to replace the nozzle 111 to adjust the compressed air spray angle of the nozzle 111, and it is also possible to arrange a handle with a dial to adjust the compressed air spray angle of the nozzle 111. The specific adjustment manner is not limited in this disclosure.

As mentioned above, in some embodiments, the air source assembly 4 and each nozzle 111 may be connected through air ducts. For example, referring to FIG. 1, in order to improve the reliability and safety of the backlight module, a duct groove 6 and a duct groove cover 7 may be arranged on the outer wall of the bottom plate 11. The duct groove 6 may be fixed on the outer wall through a duct groove fastener, and the duct groove cover 7 may be engaged to the duct groove 6, so that the air ducts may be arranged in a fixed channel formed by the duct groove 6 and the duct groove cover 7.

The light-emitting bodies 13 in the backlight module will generate a lot of heat during light emitting, which will lead to a rise in the temperature in the backlight module without timely heat dissipation, and the deformation of the diffuser plate 3 will speed up and the display quality will reduce. Considering this situation, in one possible implementation of this disclosure, heat dissipation holes 121 may be cut on the side wall 12 of the back plate 1, to form heat dissipation paths. The compressed air sprayed through the nozzles 111 into the cavity formed by the bottom plate 11 and the side wall 12 surrounding the bottom plate 11 forms air flows through the heat dissipation paths, will take away the heat with the flow of air, to achieve the purpose of cooling, so as to improve the heat dissipation capacity. Specifically, referring to FIG. 2, FIG. 3 and FIG. 5, through the heat dissipation holes 121 formed on the side wall 12, the compressed air, which is sprayed through the nozzles 111 into the cavity formed by the bottom plate 11 and the side wall 12 surrounding the bottom plate 11 and becomes atmospheric air in the cavity, may flow outward rapidly through the heat dissipation paths formed by the heat dissipation holes 121 formed on the side wall 12, and the heat generated by the light-emitting bodies 13 may also be dissipated with the air flows, so as to realize the rapid dissipation of heat.

In order to jointly control and manage the air source assembly 4, in one possible implementation of this disclosure, referring to FIG. 1, the backlight module may further include an air source control device 5, which is electrically connected with the air source assembly 4. In this case, the air source control device 5 may separately control the air source assembly 4, including but not limited to controlling the operating state of the compressor 41, the air source treatment device 42, the muffler 43, the solenoid valves 44 and the nozzles 111.

In one possible implementation, the air source control device 5 may include a controller and a temperature sensor. The temperature sensor may collect the temperature of the backlight module, for example, the temperature in the cavity may be collected. The controller is electrically connected with the temperature sensor and may obtain the temperature collected by the temperature sensor. In case where the temperature collected by the temperature sensor reaches or exceeds a temperature threshold, the speed at which the compressor 41 generates the compressed air is adjusted, such that for example the compressor 41 operates at full load, thus speeding up the speed at which the nozzles 111 spray the compressed air, accelerating the air flow in the backlight module, and further reducing the temperature of the backlight module. In case where the temperature in the backlight module is lower than the temperature threshold, speed at which the compressor 41 generates the compressed air is decreased, to save power consumption.

In one possible implementation, the air source control device 5 may control the supporting area and supporting strength of the air supporting columns formed by the compressed air sprayed by the nozzles 111 at corresponding positions according to the different deformation of the diffuser plate 3 at different positions, which may provide different supports at the different positions of the diffuser plate 3, making the diffusion plate 3 more even, and further prolonging the service life of the backlight module.

The air source control device 5 may control the supporting area and the supporting strength of the air supporting columns sprayed by the nozzles 111 by controlling the speed and pressure of the compressed air generated by the compressor 41. For example, the air source control device 5 may control the pressure of the compressed air generated by the compressor 41. For example, the compressor 41 is controlled such that the pressure of the generated compressed air is adjusted from 2 atm to 3 atm, so that the air supporting columns formed by the compressed air through the nozzles 111 have a greater supporting area and supporting strength.

For the convenience of expression, hereafter a surrounding region of the diffuser plate 3, which is a region outside of the central region of the diffuser plate 3, is divided into a sub-central region, a sub-periphery region, a periphery region according to their distances from the central region in an order outward from the central region.

The air source control device 5 may also control the amount of the compressed air sprayed by each nozzle 111 by controlling the solenoid valves 44. As an example, considering that the deformation of the diffusion plate 3 due to gravity will be greater in the central region than in the surrounding region, the air source control device 5 may make the nozzles 111 in the central region spray more air than other nozzles 111 by adjusting the flow rate of the compressed air through corresponding solenoid valves 44, such that the central region of the diffusion plate 3 may be applied greater support force.

Further, in some embodiments, the air source control device 5 may also adjust the support force in the surrounding region by controlling the flow rate of the compressed air through the solenoid valves 44. As an example, the central region of the diffusion plate 3 has the largest deformation and requires greatest support force of the air supporting columns. Compared with the central region, the deformations in the sub-central region, the sub-periphery region, and the periphery region gradually decrease, and the required support forces of the air supporting columns are also gradually decrease. Considering this situation, the air source control device 5 may realize the distribution of the compressed air by controlling the flow rate of the compressed air through the solenoid valves 44, so as to provide more reasonable support force for the diffuser plate 3.

For example, the air source control device 5 may set the amount of air sprayed by the nozzles 111 in the sub-central region to 80% of the amount of air sprayed by the nozzles 111 in the central region, the amount of air sprayed by the nozzles 111 in the sub-periphery region to 60% of the amount of air sprayed by the nozzles 111 in the central region, and the amount of air sprayed by the nozzles 111 in the periphery region to 40% of the amount of air sprayed by the nozzles 111 in the central region. Under the condition that the contact area between the air supporting columns and the diffuser plate 3 remains unchanged, the support forces applied on the diffuser plate 3 gradually decreases from the central region to the periphery region.

In some other embodiments, the air source control device 5 may also change the contact area between the air supporting columns and the diffuser plate 3 by adjusting the compressed air spray angles of the nozzles 111, so as to realize adjusting the support force on diffuser plate 3.

For example, in case where a relatively great support force of an air supporting column needs to be applied on the diffuser plate 3, the air source control device 5 may adjust the spray angle of the nozzle 111 and change the contact area of the air supporting column and the diffuser plate 3 to adjust the support force. For example, the air source control device 5 may make the amount of air sprayed by the nozzle 111 unchanged, while reduce the air spray angle of the nozzle 111, such that the contact area between the air supporting column and the diffuser plate 3 is reduced, and the support force on the diffuser plate 3 is increased. In case where a relatively small support force of an air supporting column needs to be applied on the diffuser plate 3, the air source control device 5 may make the amount of air sprayed by the nozzle 111 unchanged and increase the air spray angle of the nozzle 111, such that the contact area between the air supporting column and the diffuser plate 3 is increased, and the support force on the diffuser plate 3 is reduced. This further ensures the evenness and levelness of the diffuser plate placed on the bottom plate and avoids a poor display effect caused by an uneven diffuser plate.

It is understood that the air source control device 5 may also coordinately control the air source assembly 4 and the nozzles 111. For example, in order to provide a greater support to any region of the diffuser plate 3, the air source control device 5 makes corresponding solenoid valves 44 to open after controlling the compressor 41, the air source treatment device 42 and the muffler 43 to be in the operating state, increases the flow rate of the compressed air through the corresponding solenoid valves 44, and adjusts the air spray angle of the nozzles 111. In this way, the supporting strength and supporting area of the air supporting columns in any region of the diffuser plate 3 may be controlled, and the service life of the backlight module may be prolonged.

It should be noted that, it is possible that a researcher determine a deformed portion of the diffuser plate 3 according to his/her experience, and it is also possible that a distance sensor, such as infrared sensor, is provided on the inner wall of the bottom plate 11 so as to facilitate the air source control device 5 to obtain the distance between the diffuser plate 3 and the bottom plate 11 and determine the degree of deformation.

For example, in case where the temperature in the backlight module is high, after controlling the compressor 41, the air source treatment device 42, the muffler 43 and the solenoid valves 44 to be in the operating state, the air source control device 5 may further increase the speed at which the compressor 41 generates the compressed air and the compression ratio of the compressor 41, and make all the solenoid valves 44 to open, such that the amount of the compressed air sprayed by the corresponding nozzles 111 increases, the air quickly flows out of the heat dissipation channel formed by the heat dissipation holes 121, and the temperature in the backlight module is decreased.

Further, referring to FIG. 2, in one possible implementation of this disclosure, a filter screen 211 may be covered on each heat dissipation hole 121. For example, referring to FIG. 2, the heat dissipation holes 121 formed on the side wall 12 of the back plate 1 are each covered with a one-way filter screen. The one-way filter screen may be used to prevent outside dust and other pollutants from entering the backlight module through the heat dissipation holes 121 formed on the side wall 12 of the back plate 1 while allowing the air flow. In this cast, the one-way filter screens may be adhered to the heat dissipation holes 121 at the inside of the side wall 12, or to the heat dissipation holes 121 at the outside of the side wall 12. The specific adhering position may be set according to the actual needs. The embodiments of this disclosure do not constitute specific restrictions on it.

It is understood that the number of the heat dissipation holes 121 may be set according to different display sizes and actual requirements, and the shape of the heat dissipation holes 121 may be round hole, oval hole, square hole, etc.

Further, in a possible implementation of this disclosure, the inner wall of the back plate 1 is covered with a reflective sheet 14. By using the reflective sheet 14 to reflect the light emitted by the light-emitting bodies 13, the optical loss may be reduced as far as possible.

As mentioned above, air jet holes 112 are formed on the bottom plate 11 at the positions corresponding to each air jet port 1115 of the nozzles 111, so as to facilitate the nozzles 111 to spray the compressed air into the cavity formed by the bottom plate 11 and the side wall 12 surrounding the bottom plate 11. Correspondingly, first through holes may be cut on the reflective sheet 14 at the positions corresponding to each air jet port 1115 of the nozzles 111, so that the nozzles 111 may spray the compressed air into the cavity formed by the bottom plate 11 and the side wall 12 surrounding the bottom plate 11, so as to provide support for the diffuser plate 3.

In addition, as mentioned above, the heat dissipation holes 121 are formed on the side wall 12 of the back plate 1. In order to realize an air circulation, second through holes may be cut on the reflective sheet 14 at the positions corresponding to each heat dissipation hole 121. In this case, the second through holes are in communication with the heat dissipation holes 121 formed on the side wall 12 of the back plate 1.

In order to improve the light energy utilization ratio of the backlight module, in some embodiments of this disclosure, reflective air-permeable sheets 141 may be covered at the first through holes and at the second through holes. The reflective air-permeable sheets 141 may realize the functions of air permeation and reflecting light. This reduces light loss while allowing for air permeation.

Figure 7:
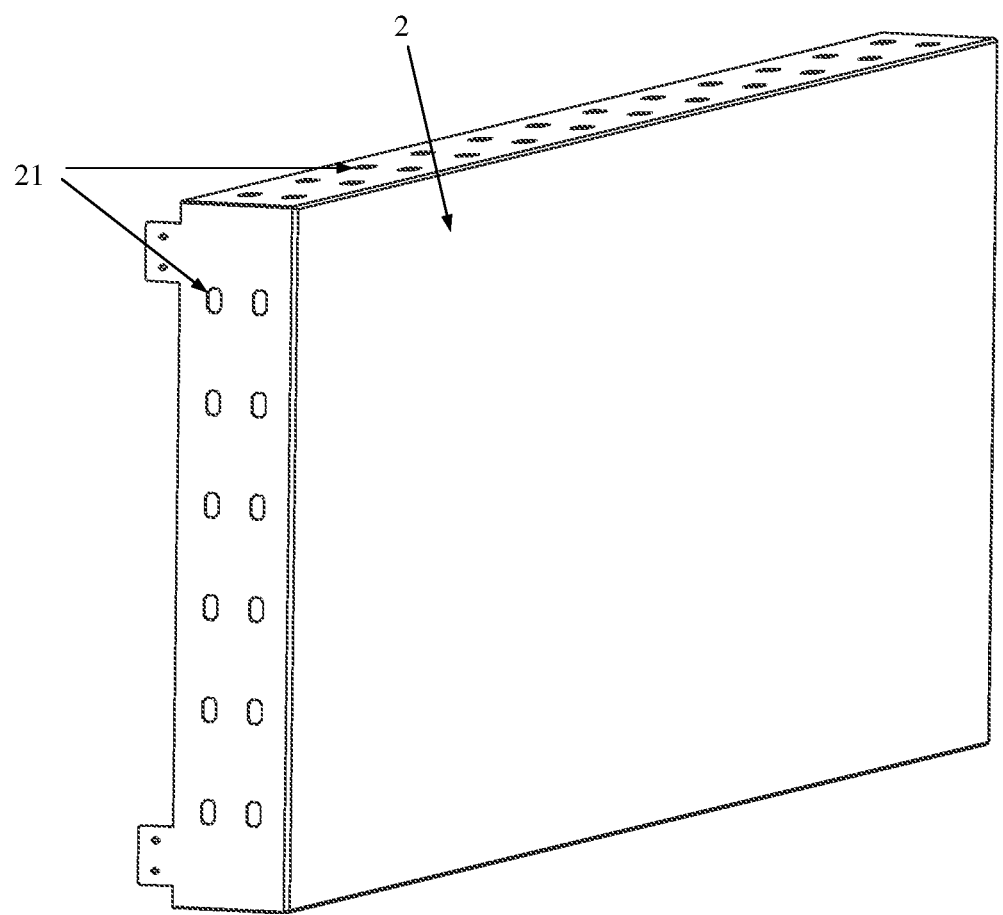
FIG. 7 is a schematic structural diagram of a back housing provided in some embodiments of this disclosure.

Further, in order to provide protection and support for the components on the outer wall of the back plate 1, referring to FIG. 7, the backlight module may further include a back housing 2, which covers on the outer wall of the back plate 1, and the air source assembly 4 and each nozzle 111 are located in a cavity surrounded and formed by the back housing 2 and the back plate 1.

In one possible implementation of this disclosure, in order to facilitate the compressor 41 to extract air and reduce the entry of external pollutants into the backlight module, vent holes 21 may be cut on the back housing 2, so that when the compressor 41 is extracting air, the air may enter the cavity surrounded and formed by the back housing 2 and the back plate 1 through the vent holes 21. The vent holes 21 may also each be covered with a filter screen 211 to filter the external air when it enters into the back housing 2.

When in use, the backlight module provided in the embodiments of this disclosure may generate compressed air through the air source assembly 4 and convey the compressed air to each nozzle connected with the air source assembly 4. Each nozzle 111 may spray the compressed air into the cavity formed by the bottom plate 11 and the side wall 12 surrounding the bottom plate 11 through the air jet holes 112 formed on the bottom plate 11, and the high-pressure air gradually becomes atmospheric air. Because an impact force will be generated when the nozzles 111 spray the compressed air into the cavity formed by the bottom plate 11 and the side wall 12 surrounding the bottom plate 11, flexible support may thus be provided to the diffuser plate 3, and the deformation of the diffuser plate 3 will be slowed down.

In the backlight module provided in the embodiments of this disclosure, an air source assembly and a plurality of nozzles, which nozzles are arranged at intervals, are provided on the outer wall of the bottom plate of the back plate. The air source assembly is in communication with each nozzle and may convey compressed air to each nozzle. Air jet holes are provided on the bottom plate at the positions corresponding to each air jet port of the nozzles, so that the compressed air may be sprayed through the nozzles to form air supporting columns after passing through the air jet holes, which may provide flexible support for the diffuser plate. Therefore, there is no need to install supporting columns on the back plate, and the problem that supporting columns block light and form dark shadows may be solved, and the display effect may be effectively improved.

Based on the same inventive concept, the embodiments of this disclosure further provide a display device, which may include: a display panel and the above-mentioned backlight module. The display panel is arranged on the out-light side of the backlight module, and the display panel may be a liquid crystal display panel. For the specific structure and related description of the backlight module, the above embodiments may be referred to, and will not be repeated here.

In the above embodiments, the description of each embodiment has its own emphasis. For part of the embodiments that is not described in detail or recited, related description of other embodiments may be referred to.

In the embodiments provided in this disclosure, it should be understood that the disclosed device/apparatus and method may be implemented otherwise. For example, the embodiments of the device/apparatus described above are only illustrative. For example, the division of the module/unit is only based on the logical function, and other divisions may be possible in practical implementations. For example, multiple units or components may be combined or integrated into another system, or some features may be omitted or not performed.

It should be understood that, when used in the specification and the accompanying claims of this disclosure, the term "include" indicates the existence of the described features, whole, steps, operations, elements and/or components, but does not preclude the existence or addition of one or more other features, whole, steps, operations, elements, components and/or a group thereof.

In the description of this disclosure, unless otherwise stated, "/" indicates that the associated objects before and after it are in an "or" relationship, for example, A/B may mean either A or B. The "and/or" in this disclosure is only an association relationship describing the associated objects, indicating that there may be three kinds of relationships, for example, A and/or B, may mean: A alone, A and B simultaneously, B alone, where A and B can be singular or plural.

In addition, in the description of this disclosure, "multiple" means two or more than two, unless otherwise stated. "At least one of the following", or similar expressions thereof, means any combination of these items, including any combination of singular or plural items. For example, at least one of a, b, or c, may represent: a, b, c, a-b, a-c, b-c, or a-b-c, where a, b, c may be singular or plural.

As used in the specification and the accompanying claims of this disclosure, the terms "if" and "whether" may be construed in context to mean "when . . . " or "once" or "in response to determination" or "in response to detection". Similarly, the phrases "if determined" or "if detected [described condition or event]" may be construed in context to mean "once determined" or "in response to determination" or "once detected [described condition or event]" or "in response to detected [described condition or event]".

References to "one embodiment" or "some embodiments" as described in the specification of this disclosure, etc., imply that one or more embodiments of this disclosure include particular features, structures or characteristics described in conjunction with such embodiments. Thus, the statements "in one embodiment", "in some embodiments", "in some other embodiments", "in some further embodiments", etc. which appear at different positions in this specification do not necessarily all refer to the same embodiments, but mean "one or more but not all embodiments", unless otherwise specifically emphasized.

Finally, it should be noted that, the above embodiments are merely intended for describing but not for limiting the technical solutions of the present disclosure. Although the present disclosure is described in detail with reference to the above-mentioned embodiments, it should be understood by those skilled in the art that, the technical solutions recited in each of the above-mentioned embodiments may still be modified, or some of or all the technical features may be equivalently replaced, while these modifications or replacements do not make the essence of the corresponding technical solutions depart from the scope of the technical solutions of each of the embodiments of the present disclosure.

What is claimed is:

1. A backlight module, comprising a diffuser plate and a back plate disposed opposite to each other,
   wherein the back plate comprises a bottom plate and a side wall surrounding the bottom plate, the diffuser plate is connected with the side wall of the back plate; a plurality of light-emitting bodies are provided at intervals on an inner wall of the back plate, and the diffuser plate is positioned at an out-light side of the plurality of light-emitting bodies;
   wherein an air source assembly and a plurality of nozzles, which nozzles are arranged at intervals, are provided on an outer wall of the bottom plate;
   the air source assembly is in communication with each of the nozzles for conveying compressed air to each of the nozzle, air jet holes are cut on the bottom plate at positions corresponding to each air jet port of the nozzles, and the nozzles are used for spraying the compressed air through the air jet holes to form air supporting columns to support the diffuser plate; and
   wherein the air source assembly comprises:
   a compressor and an air source treatment device;
   wherein the compressor is fixed to the outer wall of the bottom plate through a compressor fastener, and the compressor is used for generating the compressed air; and
   an air inlet of the air source treatment device is in communication with an air outlet of the compressor, an air outlet of the air source treatment device is in communication with each air inlet of the nozzles, and the air source treatment device is used for adjusting an amount of the compressed air and/or filtering the compressed air.

2. The backlight module according to claim 1, wherein the air source assembly further comprises:
   a solenoid valve, through which the air outlet of the air source treatment device is in communication with each of the nozzles.

3. The backlight module according to claim 2, wherein the air outlets of the air source treatment device correspond to the nozzles one to one, the air outlets of the air source treatment device correspond to the solenoid valves one to one, and each of the air outlets of the air source treatment device is in communication with a corresponding nozzle through a corresponding solenoid valve.

4. The backlight module according to claim 1, wherein the air source assembly further comprises a muffler, which is connected to the compressor and/or to the air source treatment device.

5. The backlight module according to claim 1, wherein the nozzles comprise a plurality of air jet ports, whose cross-sectional area gradually increases near the inner wall of the back plate in a direction from the inner wall to an outer wall of the back plate.

6. The backlight module according to claim 1, wherein a heat dissipation hole is cut on the side wall of the back plate, and a filter screen is covered on the heat dissipation hole.

7. The backlight module according to claim 6, wherein a reflective sheet is covered on the inner wall of the back plate, first through holes are cut on the reflective sheet at positions corresponding to each air jet ports of the nozzles, second through holes are cut on the reflective sheet at positions corresponding to each heat dissipation hole, and both the first through holes and the second through holes are covered with a reflective air-permeable sheet.

8. The backlight module according to claim 1, wherein the backlight module further comprises a back housing, which is provided on an outer wall of the back plate, the air source assembly and each of the nozzles are positioned in a cavity surrounded and formed by the back housing and the back plate, a vent hole is cut on the back housing and a filter screen is covered on the vent hole.

9. A display device comprising a display panel a backlight module, wherein the display panel is arranged at an out-light side of the backlight module, and the backlight module comprises a diffuser plate and a back plate disposed opposite to each other, wherein the back plate comprises a bottom plate and a side wall surrounding the bottom plate, the diffuser plate is connected with the side wall of the back plate; a plurality of light-emitting bodies are provided at intervals on an inner wall of the back plate, and the diffuser plate is positioned at an out-light side of the plurality of light-emitting bodies;

wherein an air source assembly and a plurality of nozzles, which nozzles are arranged at intervals, are provided on an outer wall of the bottom plate;

the air source assembly is in communication with each of the nozzles for conveying compressed air to each of the nozzle, air jet holes are cut on the bottom plate at positions corresponding to each air jet port of the nozzles, and the nozzles are used for spraying the compressed air through the air jet holes to form air supporting columns to support the diffuser plate; and wherein the air source assembly comprises:

a compressor and an air source treatment device;

wherein the compressor is fixed to the outer wall of the bottom plate through a compressor fastener, and the compressor is used for generating the compressed air; and an air inlet of the air source treatment device is in communication with an air outlet of the compressor, an air outlet of the air source treatment device is in communication with each air inlet of the nozzles, and the air source treatment device is used for adjusting an amount of the compressed air and/or filtering the compressed air.

10. The display device according to claim 9, wherein the air source assembly further comprises:

a solenoid valve through which the air outlet of the air source treatment device is in communication with each of the nozzles.

11. The display device according to claim 10, wherein the air outlets of the air source treatment device correspond to the nozzles one to one, the air outlets of the air source treatment device correspond to the solenoid valves one to one, and each of the air outlets of the air source treatment device is in communication with a corresponding nozzle through a corresponding solenoid valve.

12. The display device according to claim 9, wherein the air source assembly further comprises a muffler, which is connected to the compressor and/or to the air source treatment device.

13. The display device according to claim 9, wherein the nozzles comprise a plurality of air jet ports, whose cross-sectional area gradually increases near the inner wall of the back plate in a direction from the inner wall to an outer wall of the back plate.

14. The display device according to claim 9, wherein a heat dissipation hole is cut on the side wall of the back plate, and a filter screen is covered on the heat dissipation hole.

15. The display device according to claim 14, wherein a reflective sheet is covered on the inner wall of the back plate, first through holes are cut on the reflective sheet at positions corresponding to each air jet ports of the nozzles, second through holes are cut on the reflective sheet at positions corresponding to each heat dissipation hole, and both the first through holes and the second through holes are covered with a reflective air-permeable sheet.

16. The display device according to claim 9, wherein the backlight module further comprises a back housing, which is provided on an outer wall of the back plate, the air source assembly and each of the nozzles are positioned in a cavity surrounded and formed by the back housing and the back plate, a vent hole is cut on the back housing and a filter screen is covered on the vent hole.

\* \* \* \* \*